(12) United States Patent
Werning et al.

(10) Patent No.: US 12,296,794 B2
(45) Date of Patent: May 13, 2025

(54) AGRICULTURAL MACHINE WITH DYNAMIC DEBRIS REMOVAL

(71) Applicant: Deere & Company, Moline, IL (US)

(72) Inventors: Jason L. Werning, Blue Grass, IA (US); William D. Graham, East Moline, IL (US)

(73) Assignee: Deere &Company, Moline, IL (US)

( * ) Notice: Subject to any disclaimer, the term of this patent is extended or adjusted under 35 U.S.C. 154(b) by 293 days.

(21) Appl. No.: 17/825,808

(22) Filed: May 26, 2022

(65) Prior Publication Data

US 2023/0382354 A1    Nov. 30, 2023

(51) Int. Cl.
*B60S 1/68*       (2006.01)
*A01B 76/00*   (2006.01)

(52) U.S. Cl.
CPC ............... *B60S 1/68* (2013.01); *A01B 76/00* (2013.01)

(58) Field of Classification Search
CPC ................................ B60S 1/68; A01B 76/00
USPC ............................................................ 280/855
See application file for complete search history.

(56) References Cited

U.S. PATENT DOCUMENTS

| | | | | |
|---|---|---|---|---|
| 1,877,005 A * | 9/1932 | Merklin | ..................... | B60S 1/68 15/246 |
| 2,077,919 A * | 4/1937 | Engstrom | ................. | B60S 1/68 280/856 |
| 3,177,830 A * | 4/1965 | Zimmerman | ............ | A01C 5/06 111/194 |
| 3,259,036 A * | 7/1966 | Peterson | ................. | E02D 3/026 404/121 |
| 5,078,528 A * | 1/1992 | Schmidt | ................... | F16C 23/02 403/DIG. 8 |
| 5,295,277 A * | 3/1994 | Koenigs | ................ | E01H 1/0854 15/83 |
| 5,430,906 A * | 7/1995 | Drury | .................. | B62D 25/182 280/158.1 |
| 6,035,479 A * | 3/2000 | Basham | ................ | E01H 1/0854 15/83 |
| 6,321,667 B1 * | 11/2001 | Shoup | .................... | A01C 5/068 111/164 |
| 6,434,781 B1 * | 8/2002 | Guerra | ................... | A63B 57/60 280/DIG. 6 |
| 9,346,438 B1 * | 5/2016 | Parker, III | ............... | A61G 5/10 |
| 9,872,423 B2 * | 1/2018 | Anderson | ............. | A01C 5/068 |
| 10,196,048 B2 * | 2/2019 | Yoon | ..................... | B60B 33/045 |
| 10,654,533 B2 * | 5/2020 | Gustafson | ............ | B62D 55/202 |

(Continued)

FOREIGN PATENT DOCUMENTS

| CA | 2769535 A1 | 8/2013 |
|---|---|---|
| CH | 0563898 A5 | 7/1975 |

(Continued)

OTHER PUBLICATIONS

Extended European Search Report and Written Opinion issued in European Patent Application No. 23175715.4, dated Oct. 18, 2023, in 7 pages.

*Primary Examiner* — Hau V Phan
(74) *Attorney, Agent, or Firm* — Kelly, Holt & Christenson; Joseph R. Kelly (57) ABSTRACT

A sensor generates an output signal indicative of an attribute of a limited amount of material above the sensor. A controller receives the output signal and incorporates a corresponding variable into a programmatic calculation of an indication of a volume of material in a tank.

17 Claims, 7 Drawing Sheets

(56) References Cited

U.S. PATENT DOCUMENTS

| | | | |
|---|---|---|---|
| 11,279,326 B1 | 3/2022 | Siegel, Jr. | |
| 11,446,718 B2* | 9/2022 | Ayres | B08B 7/0071 |
| 11,826,293 B1* | 11/2023 | Tolbert | A61G 5/1035 |
| 11,964,637 B2* | 4/2024 | Paad | B60S 1/68 |
| 2017/0267217 A1 | 9/2017 | Yoon et al. | |
| 2019/0254226 A1* | 8/2019 | Hodel | A01C 23/025 |
| 2020/0267882 A1* | 8/2020 | McLuckie | A01B 5/04 |

FOREIGN PATENT DOCUMENTS

| | | |
|---|---|---|
| CN | 112224175 A | 1/2021 |
| FR | 2668991 A1 | 5/1992 |
| GB | 208676 A | 12/1923 |
| GB | 542499 A | 1/1942 |

* cited by examiner

AGRICULTURAL MACHINE WITH DYNAMIC DEBRIS REMOVAL

FIELD OF THE DESCRIPTION

This disclosure relates to removal of debris from a machine and is particularly useful in the context of the removal of mud or other materials from parts of an in-motion agricultural machine.

BACKGROUND

During operations of agricultural machinery, ground engaging components of the machine will commonly contact and interact with the soil. This is true in the context of a variety of different mechanized agricultural operations including but not limited to tillage, planting, harvesting, and spraying operations. This is also true in the context of a variety of different implements, machines and devices including but not limited to towed implements and self-propelled machines (e.g., tractors, combines, sprayers, etc.). During these and other mechanized agricultural operations utilizing these and other agricultural machines and implements, the soil as well as residue or trash residing in or on the soil sometimes inevitably accumulates on the ground engaging components. This accumulation sometimes undesirably impacts the agricultural operation being carried out, sometimes negatively impacts future machine operation, and sometimes damages the ground engaging components or the machine providing such ground engaging components.

No matter the particular type of machine or implement, ground engaging surfaces of a wheel (e.g., a tire surface in many instances) are especially vulnerable to undesirable accumulations of mud or other ground debris. A ground engaging surface of a wheel tends to become increasingly "sticky" as more and more debris accumulates, such that debris accumulation invites more debris accumulation. This is unfortunate because the accumulation of debris on a ground engaging surface of a wheel has a potential to negatively affect ideal machine operation and performance. For example, when a ground engaging surface of a wheel component of a planting or seeding machine become partially or completely coated in ground debris, this sometimes causes undesirable seed placement patterns, such as undesirable seed population and/or depth. Thus, in performing seeding or planting operations, it may be desirable to actively remove debris from a ground engaging surface of a wheel component of the seeding or planting machine.

Attempts have been made to remove debris from a ground engaging surface of a wheel during operation of an agricultural machine. For example, it is known to mount a fixed scraper blade proximate to the ground engaging surface. As the wheel rotates, debris is drug by the ground engaging surface into the scraper blade causing it to be dislodged from the ground engaging surface and fall to the ground. Unfortunately, outcomes produced by implementation of a scraper blade are not consistently positive. For one thing, it is difficult to mount the scraper blade in a position such that it is close enough to the ground engaging surface of the wheel to remove most debris but not so close that it will cause damaging contact. It is unfortunately not uncommon for a scraper blade to cause undesirable wear on the ground engaging surface of a wheel. Further, the static nature of the scraper blade tends to encourage a relatively long-term accumulation of debris on the blade itself. This is less than ideal especially when wet debris like mud is allowed to dry and harden, essentially changing the shape and profile of the scraper blade (i.e., when considering that the hardened debris effectively becomes like an extension of the scraper blade itself). In this case, debris buildup on the scraper blade can cause debris accumulation to become worse instead of better, even potentially having a negative impact n the intended free rotation of the wheel.

The discussion above is merely provided for general background information and is not intended to be used as an aid in determining the scope of the claimed subject matter.

SUMMARY

Debris removal components in the context of agricultural machines are provided.

Example 1 is an agricultural machine comprising a debris removal component, the debris removal component having a rotatable portion that rotates around an axis that is at least substantially parallel to an axis of rotation of a wheel that is part of the agricultural machine, and wherein the debris removal component is mounted proximate to a ground engaging surface of the wheel.

Example 2 is the agricultural machine of any or all previous examples, wherein the rotatable portion of the debris removal component is a paddle wheel.

Example 3 is the agricultural machine of any or all previous examples, wherein the paddle wheel is rotatably mounted to a side plate.

Example 4 is the agricultural machine of any or all previous examples, wherein the rotatable portion includes a series of paddles.

Example 5 is the agricultural machine of any or all previous examples, wherein a bearing assembly is utilized to facilitate a rotatable connection between the rotatable portion and a side plate.

Example 6 is an agricultural machine component comprising a paddle wheel configured to be mounted proximate to a ground engaging surface of a wheel, wherein the agricultural machine component further comprises a side plate and a bearing assembly, the bearing assembly facilitating a rotatable connection between the paddle wheel and the side plate.

Example 7 is the agricultural component of any or all previous examples, wherein the paddle wheel further comprises a plurality of paddles.

Example 8 is the agricultural component of any or all previous examples, further comprising a plurality of adjustment slots formed in the side plate.

Example 9 is an agricultural machine comprising a debris removal component mounted proximate to a ground engaging surface of a wheel, the debris removal component comprising a paddle that is configured to rotate around a first axis in a direction that is opposite of a direction in which the wheel turns around a second axis during operation of the agricultural machine.

Example 10 is the agricultural machine of any or all previous examples, wherein the paddle is one of a series of paddles that are part of the debris removal component, all paddles in the series being configured to rotate around the first axis in a direction that is opposite of a direction in which the wheel turns around a second axis during operation of the agricultural machine.

Example 11 is the agricultural machine of any or all previous examples, wherein the first and second axes are separated and substantially parallel to one another.

Example 12 is the agricultural machine of any or all previous examples, wherein the debris removal component is adjustably mounted so that a distance between the debris removal component and the ground engaging surface is mechanically selectable.

Example 13 is the agricultural machine of any or all previous examples, wherein the debris removal component is mounted by way of a side plate.

Example 14 is the agricultural machine of any or all previous examples, further comprising an adjustment slot formed in the side plate.

Example 15 is the agricultural machine of any or all previous examples, wherein the debris removal component includes a bearing assembly.

Example 16 is the agricultural machine of any or all previous examples, wherein the debris removal component includes a bearing assembly that rotatably supports a paddle wheel of which the paddle is a part.

Example 17 is the agricultural machine of any or all previous examples, wherein the paddle is a part of a paddle wheel.

Example 18 is the agricultural machine of any or all previous examples, wherein the debris removal component further comprises a bushing that separates a side plate from a paddle wheel, the paddle being part of the paddle wheel.

Example 19 is the agricultural machine of any or all previous examples, wherein the debris removal component is mounted proximate to the ground engaging surface by way of a side plate.

Example 20 is the agricultural machine of any or all previous examples, wherein the side plate is adjustable so as to selectively change a distance between a portion of the debris removal component and the ground engaging surface.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, it can be desirable to remove as much ground debris as possible from an actively operating agricultural machine. This is true in the context of a wide variety of different agricultural operations, implements, machines and devices. It can be especially true following certain weather events (e.g., rainfall) that increase the "stickiness" of certain types of ground debris such as soil. Increased "stickiness" generally encourages increased accumulation on the machine. Further, wet or moist debris can present a risk to ideal machine operation when it is not removed but is instead allowed to become dry and hardened.

Whether or not encountered debris is moist or wet, it is generally a challenge anyway to remove debris from an operating agricultural machine consistently and in a timely manner. A consequence of ineffective or delayed removal will in many instances be an increased likelihood that intended performance characteristics of the agricultural machine will be negatively impacted. All described here is particularly relevant to the removal of debris from ground engaging components of an agricultural machine. Wheels having a tire or other surface that is designed to engage the ground are especially susceptible to the described debris accumulation scenarios.

The present description thus proceeds with respect to an active debris removal component that at least substantially reduces any build up of debris on an agricultural machine, for example, on a ground engaging surface of a wheel of the agricultural machine. The active debris removal component is particularly useful when mounted proximate to a wheel, including but certainly not limited to a gauge or transport wheel provided on an agricultural machine designed to facilitate seeding or planting operations. The active debris removal component actively removes debris at least from a ground engaging surface of the tire, such as but not necessarily limited to a tire surface.

Figure 1:
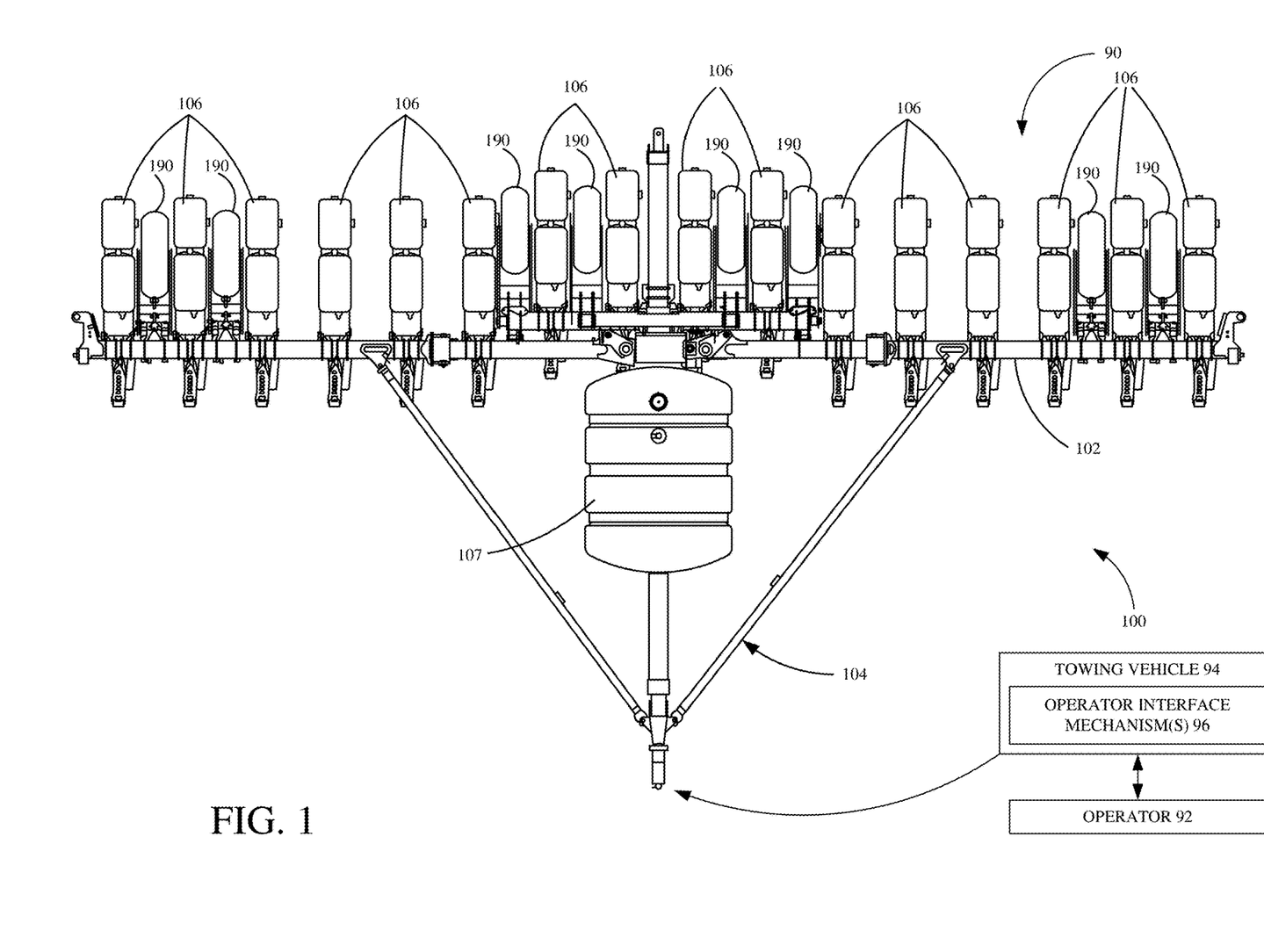
FIG. 1 is a top view of one example of a seeding or planting machine, shown in a partial pictorial and partial schematic form.

FIG. 1 is a partial pictorial, partial schematic top view of one example of an architecture 90 that includes agricultural planting machine 100 and a towing vehicle 94, that is operated by operator 92 (although vehicle 94 could conceivably be an unmanned autonomous vehicle). Operator 92 can illustratively interact with operator interface mechanisms 96 to manipulate and control vehicle 94, and some or all portions of machine 100.

Machine 100 is a row crop planting machine that illustratively includes a toolbar 102 that is part of a frame 104. FIG. 1 also shows that a plurality of planting row units 106 are mounted to the toolbar 102. Machine 100 can be towed behind towing vehicle 94, such as a tractor. FIG. 1 shows that material can be dispensed by row units 106 in or near the rows being planted.

Figure 2:
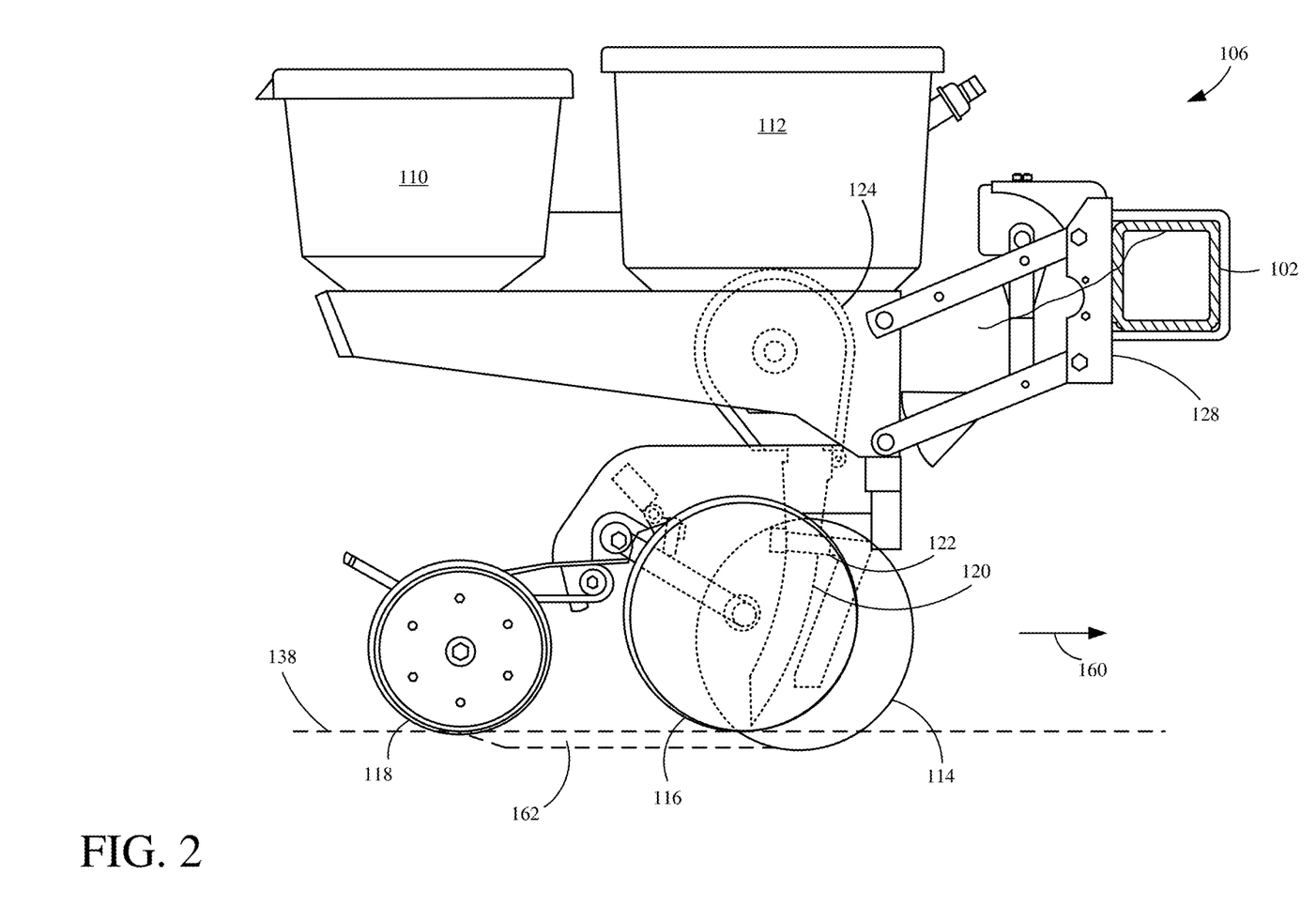
FIG. 2 is a side view showing one example of a row unit of the planting machine illustrated in FIG. 1.

FIG. 2 is a side view of one example of a row unit 106. Row unit 106 illustratively includes a chemical tank (also referred to herein as a commodity tank) 110 and a seed storage tank 112. It also illustratively includes one or more disc openers 114, a set of gauge wheels 116, and a set of closing wheels 118. Seeds from tank 112 are fed into a seed meter 124. The seed meter 124 controls the rate at which seeds are dropped into a seed tube 120 or other seed delivery system, such as a brush belt or flighted belt, from seed storage tank 112. The seeds can be sensed by a seed sensor 122. The seeds are dropped into a seed trench 162 formed in ground 138.

A downforce actuator 126 is mounted on a coupling assembly 128 that couples row unit 106 to toolbar 102. Actuator 126 can be a hydraulic actuator, a pneumatic actuator, a spring-based mechanical actuator or a wide variety of other actuators.

In operation, row unit 106 travels generally in the direction indicated by arrow 160. The double disc opener 114 opens a furrow 162 in the soil 138, and the depth of the furrow 162 is set by planting depth actuator assembly 154, which itself, control the offset between the lowest parts of gauge wheels 116 and disc opener 114. Seeds are dropped through seed tube 120, into the furrow 162 and closing wheels 118 close the furrow 162 (e.g., push soil back into the furrow 162).

As the seeds are dropped through seed tube 120, they can be sensed by seed sensor 122. In another example, row unit 106 may be provided with a seed firmer that is positioned to travel through the furrow 162, after seeds are placed in furrow 162, to firm the seeds in place. A seed sensor can be placed on the seed firmer and generate a sensor indicative of a seed. These are simply examples of effective configurations.

Figure 3:
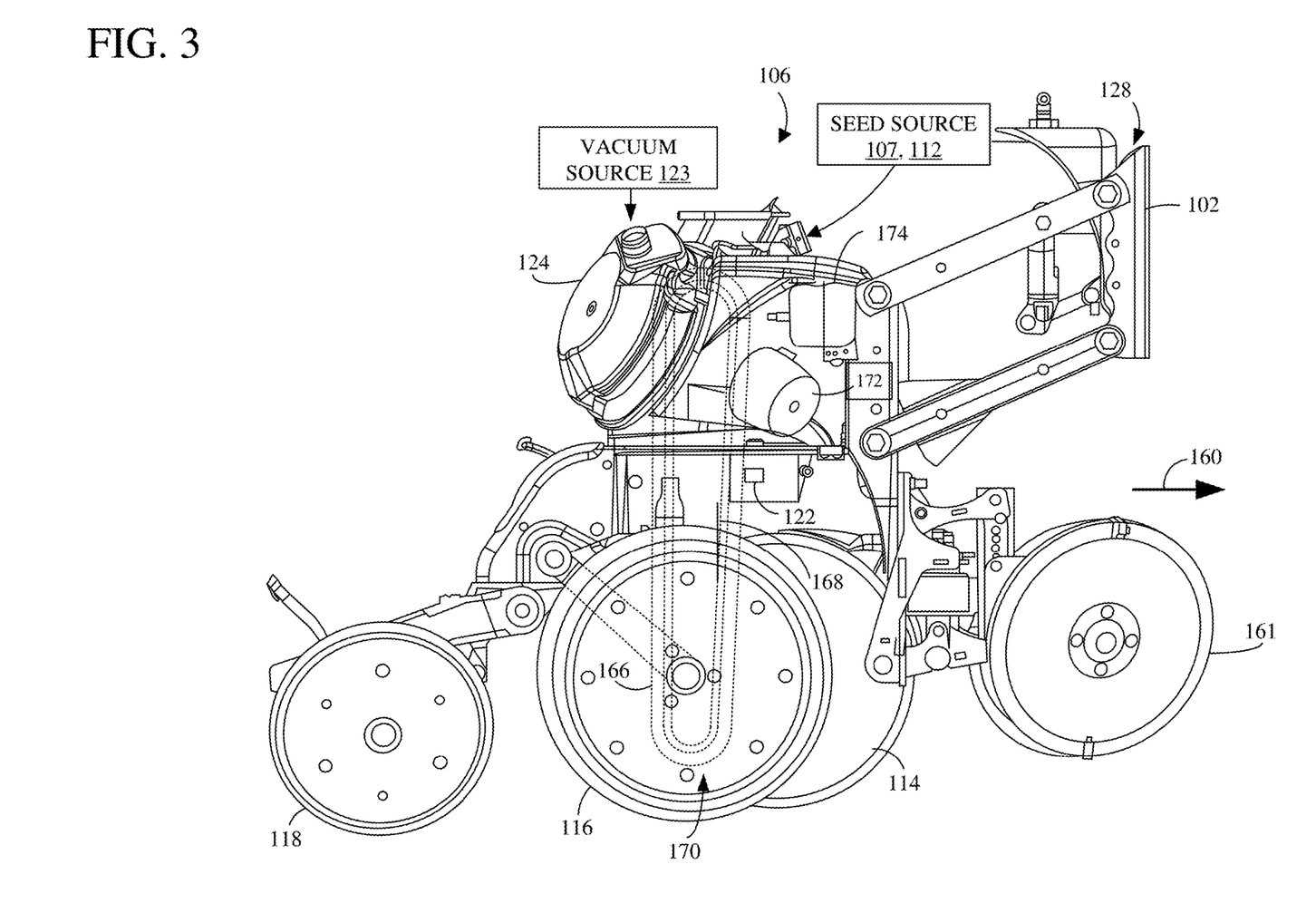
FIG. 3 is a side view showing another example of a row unit of the planting machine illustrated in FIG. 1.

FIG. 3 shows another example of a row unit 106. Some items are similar to those shown in FIG. 2, and they are similarly numbered. FIG. 3 shows that row unit 106 can also include a row cleaner 161 which can remove debris, clumps, residue, etc. from the portion of the surface where opener 114 will open the furrow. Also, FIG. 3 shows that seeds can be provided to meter 124 from a seed source which may be seed tank 112, tank 107 (shown in FIG. 1) or from another seed source.

Also, instead of the seed delivery system being a seed tube 120 as shown in FIG. 2, which relies on gravity to move the seed to the furrow 162, the seed delivery system shown in FIG. 3 is an assistive seed delivery system 166. Assistive seed delivery system 166 also illustratively has a seed sensor 122 disposed therein. System 166 has an outlet end 170 where the seeds exit assistive system 166, into furrow 162, where they again reach their final resting location. FIG. 3 shows a meter motor 172 that drives rotation of meter 124 and a delivery motor 174 that drives rotation of assistive delivery system 166. Another possibility is for meter 124 and assistive seed delivery system 166 to be driven by a single motor. In one example, a vacuum source 123 pulls a vacuum in meter 124 to aid in seed metering.

As is reflected in the components of the seed or planting machine described in relation to FIGS. 1-3, it is common for agricultural equipment to include ground engaging components. It is also common for agricultural equipment to be moved on wheels having a ground engaging surface. In many instances, the surface of the wheel that is ground engaging will be a tire surface. An example of such a wheel arrangement is shown FIG. 1. In this case, a plurality of wheels 190 each include a ground engaging outer surface (e.g., a ground engaging tire surface). The wheels 190 roll and by doing so facilitate movement of the row crop planting machine, for example, through a field while the machine is performing its intended agricultural operations. As has been described herein, it can be undesirable for debris to accumulate on a surface of an agricultural machine, a condition to which ground engaging surfaces such as ground engaging wheel surfaces are especially susceptible.

Figure 4:
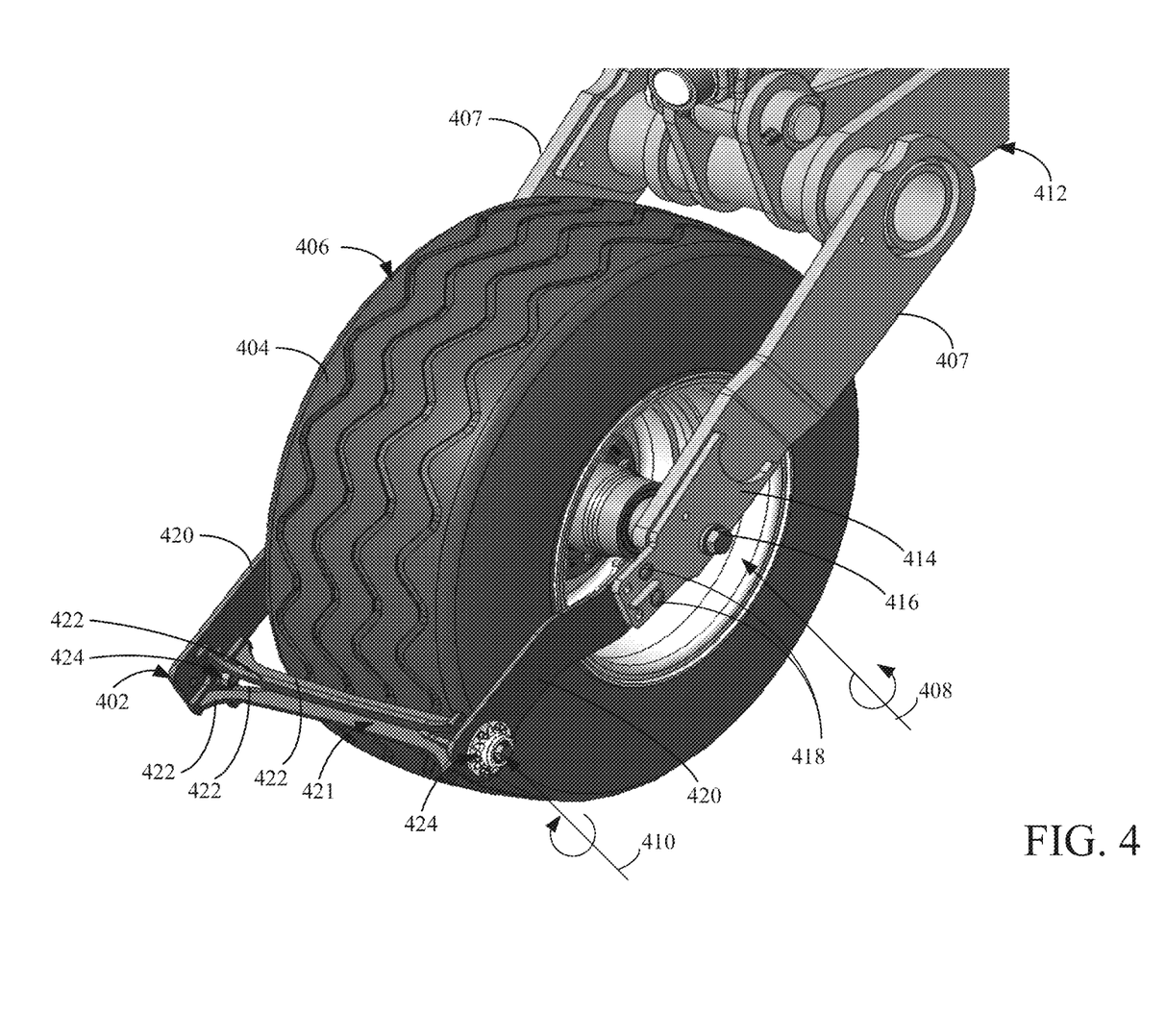
FIG. 4 is a perspective view of a rotating debris removal component mounted proximate to a ground engaging surface of a wheel.

FIG. 4 is a perspective view of a rotating debris removal component 402 mounted proximate to a ground engaging surface 404 of a wheel 406. Wheel 406 is illustratively a component of an agricultural machine of which only a small portion is shown in FIG. 4. Wheel 406 is, in an example scenario, one of wheels 190 shown as being part of machine 100 in FIG. 1. A function of debris removal component 402 is to remove debris from surface 404. While component 402 is shown as being mounted to facilitate debris removal from the ground engaging surface of a wheel, it should be emphasized that it would just as easily be mounted to facilitate debris removal from any surface of a machine, ground engaging or otherwise. For example, component 402 can be mounted proximate to a surface (e.g., a ground engaging surface) of one of the gauge wheels 116 described in relation to FIGS. 2 and 3. Again, the illustrated configuration where component 402 is utilized to clear debris from wheel 406 (i.e., from a transport wheel) should not be considered to infer limitation. Nor should component 402 be considered to be limited to being mounted on a seeding planting type of agricultural machine.

Wheel 406 is rotatably mounted to a plurality of wheel support arms 407. The wheel support arms 407 are then connected to a portion 412 of an agricultural machine that is mostly not shown in FIG. 4. Only portion 412 is shown for the purpose of simplification, as well as because the details of the machine are not critical to any functionality of the debris removal component 402. Wheel 406 is configured to rotate around an axis 408, for example, as the machine to which it is attached by arms 407, is moved during an agricultural operation. Of course, wheel 406 turns while arms 407 generally remain stationary.

On both sides of wheel 406, a connection mechanism 616 (shown for illustrative purposes to be a bolt) is utilized to rigidly connect an extension bracket 416 to the support arm 407. In FIG. 4, the extension bracket 416 and connection mechanism 416 on the far side of wheel are not shown because the view is blocked by wheel 406. One or more connectors (shown for illustrative purposes to be two bolts) 418 are then utilized to rigidly connected to side plates 420. Side plates 420 are illustratively part of the rotating debris removal component 402. The connection between mounting plate 414 and side plate 420 on the far side of wheel 406 is not shown in FIG. 4 because the view is blocked by wheel 406.

The rotating debris removal component 402 next includes a paddle wheel 421 that includes a series of four paddles 422. It is not critical that paddle wheel 421 include exactly four paddles. It could just easily include fewer or more paddles. Paddle wheel 421 is then rotatably connected to side plates 420 by a bearing assembly 424 (illustratively but not necessarily a self-aligning bearing assembly). A cap is illustratively placed over assembly 424 at least to support improved aesthetic appeal. The rotatable arrangement between paddle wheel 421 and side plates 420 is such that paddle wheel rotates around an axis 410. For example, as wheel 406 rotates around axis 408, debris is illustratively raised from the ground by surface 404. In this way, the debris is drug into one or more of paddles 422, causing the debris to essentially be "flicked" or "paddled" away. This illustratively will at least sometimes cause paddle wheel 421 to rotate around axis 410, generally in a direction that is opposite to the direction of rotation of wheel 406. Contact between debris and a paddle 422 need not necessarily occur for rotation of paddle wheel 421 to be provoked. Air flow and static energy from surface 404, as well as other conditional influences, will illustratively sometimes be enough in certain conditions to provoke rotation of the paddle wheel 421. Of course, as paddle wheel 421 rotates, debris picked up by surface 404 will be impacted (both directly and indirectly) by paddle wheel 421, cause the debris to be dynamically cleared from surface 404, and from tire 406 more generally.

Figure 5:
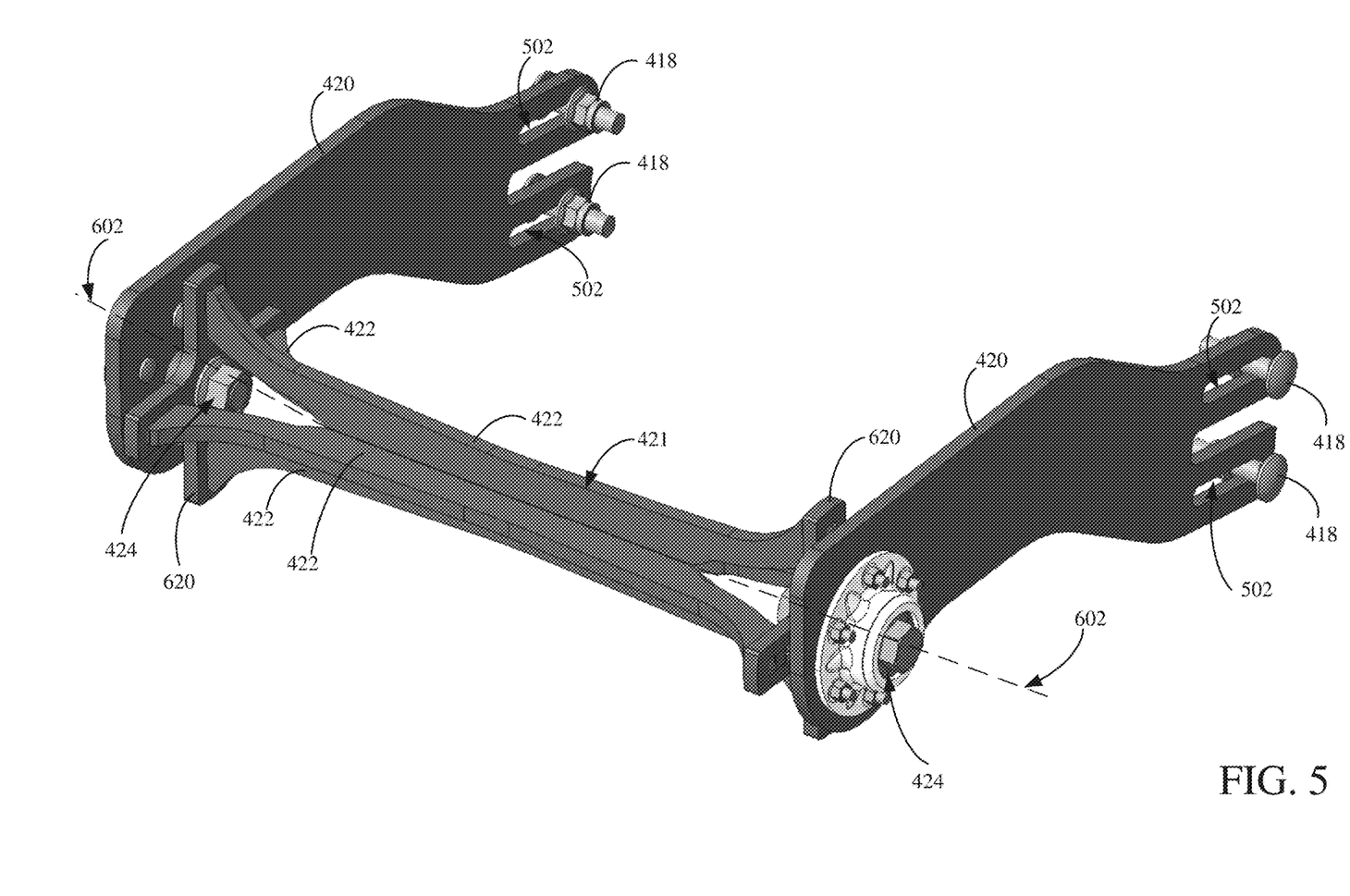
FIG. 5 is a perspective view of the rotating debris removal component of FIG. 4.

FIG. 5 is a perspective view of the rotating debris removal component 402. Some items are similar to those shown in FIG. 4, and they are similarly numbered. A feature shown in FIG. 5 that was generally obscured from view in FIG. 4 are a plurality of adjustment slots 502 formed in side plates 420. Those skilled in the art will appreciate that the positional relationship between side plates 420 and mounting plates 414 is made adjustable by slots 502. For example, connection mechanisms 418 can illustratively be activated to rigidly fix a side plate 420 to a mounting plate 414 anywhere along slot 502. By selecting wherein in slot 502 to tighten or otherwise the activate the connection mechanism 418, one can effectively choose how close paddles 422 should come to surface 404. The spacing between paddles 422 and surface 404 is therefore adjustable.

Figure 6:
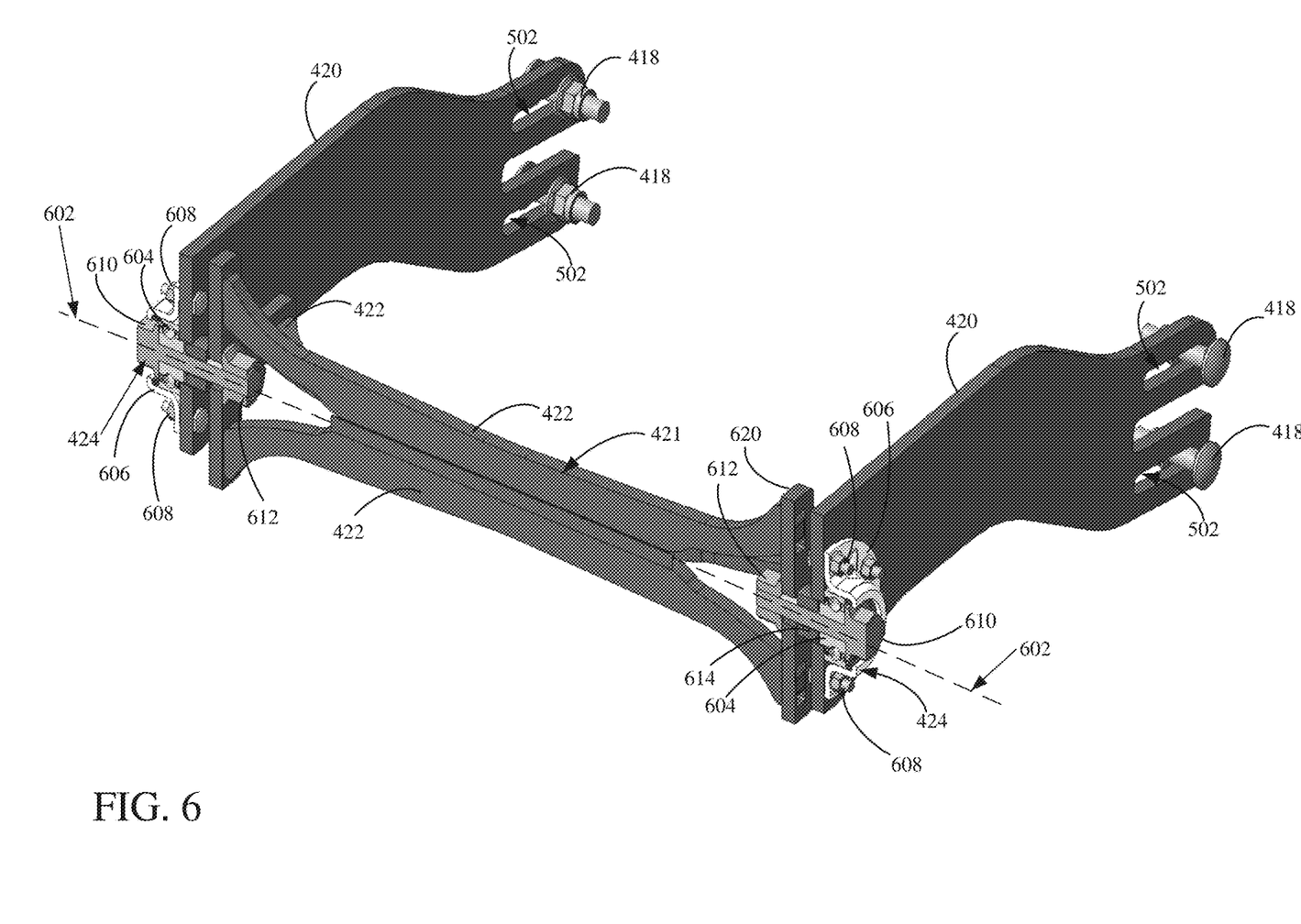
FIG. 6 is a cross-sectional view of the rotating debris removal component of FIG. 5.

FIG. 6 is a cross-sectional view of the rotating debris removal component 402. Some items are similar to those shown in FIGS. 4 and 5, and they are similarly numbered. The cross-section of FIG. 6 is taken along an axis 602 that is labeled in both of FIGS. 5 and 6. The front portion of the rotating debris removal component 402 has been completely removed in order to show features, especially features of bearing assembly 424, in greater detail.

Bearing assembly 424 includes a bearing 604 that is secured by a bearing housing 606. Bearing housing 606 is secured to side plates 420 with a plurality of connection mechanisms 608, of which only a representative couple have been labeled in FIG. 6 to eliminate clutter from the drawing. A through bolt is rotatably received through the bearing 604, and then ultimately connected to paddle wheel 421 with a corresponding connector 612. Thus, paddle wheel 421 is rotatably mounted by way of the rotatable mounting of through bolt 610 within bearing 604. A bushing 614 is illustratively provided in order to create and maintain a space between paddle wheel 421 and the side plate 420. The bushing can be formed as an integral part of the paddle wheel 421, or it can be a separated, floating bushing. Both options are contemplated. It is further contemplated that the gap between wheel 421 and plate 420 be covered with a shield to prevent any wrapping of material in the bushing area.

As shown, the bearing assembly is essentially integrated into the side plates 420. It is contemplated that it is certainly possible to instead design the bearing assembly to be instead integrated into the ends of the paddle wheel 421. However, integration into the side plates at least provides a convenient access point for servicing.

It should be noted that the selection of the illustrated and shown bearing assembly 424 is exemplary in that other rotational mechanisms could just as easily be utilized. For example, a bushing comprised of a material capable of withstanding rotational wear would be utilized in place of the bearing assembly. The real point is to support rotation. The precise details of how rotation is supported are not necessarily critical.

Further, though paddles 422 are shown in FIGS. 5 and 6 as being one integral piece inserted into separated end pieces 620, the design is certainly not limited to such a configuration. The paddles can just as easily be integrally formed with the end pieces 620. Further, each paddle 422 could just as easily be formed as a separate piece that connects to the end pieces 620. All combinations of separated and integrally formed parts are contemplated and possible.

The described rotating debris removal component 402 is a somewhat cylindrical device that has multiple paddles rotating about an axis, so as to form a beater or caged roller, of a sort. The rotational axis of the paddle wheel is supported, and passes through, a bearing area of a support arm, in a manner that supports convenient serviceability. The component discourages a buildup of debris on the part of a machine proximate to which it is mounted. The support arms of the component 402 support mounting in many possible locations on an agricultural machine where debris removal is desirable. For some mounting installations, it is contemplated for the paddle wheel to be supported by a single support arm instead of a support arm on both sides of the paddle wheel.

When mounted proximate to a ground engaging surface of a wheel, the rotating debris removal component 402 operates to discourage debris buildup on the surface while at the same time discouraging a type of contact with the surface that risks doing damage due to scrubbing or friction during use. The mounting scheme is designed to be adjustable to enable selection of a preferred gap or distance between the rotating paddles and the ground engaging or other machine surface. In this way, a preferred debris removal sensitivity may be selected. It is worth noting that, when mounted proximate to a ground engaging surface of a wheel, the direction of rotation of the paddle wheel will generally be in the opposite direction as the rotation of the wheel itself. This is advantageous at least because the paddles of the paddle wheel will actively clean debris off when there is enough debris on the ground engaging surface to make contact and trigger motion of the paddle wheel.

The paddle wheel is illustratively mounted to support its own movement in complete rotations, one after the other. The speed and motion of the paddle wheel is driven by the speed of the tire rotation during active operation of the agricultural machine, for example. Different paddle numbers, shapes, and sizes will produce different rotation speeds and effects, and it is contemplated to utilize different configurations for different applications. Rotation of the paddle wheel will most often be triggered by debris contact. Thus, in this manner, the paddle wheel actively cleans the surface without requirement of any auxiliary power source and is activated automatically when it is most needed.

Figure 7:
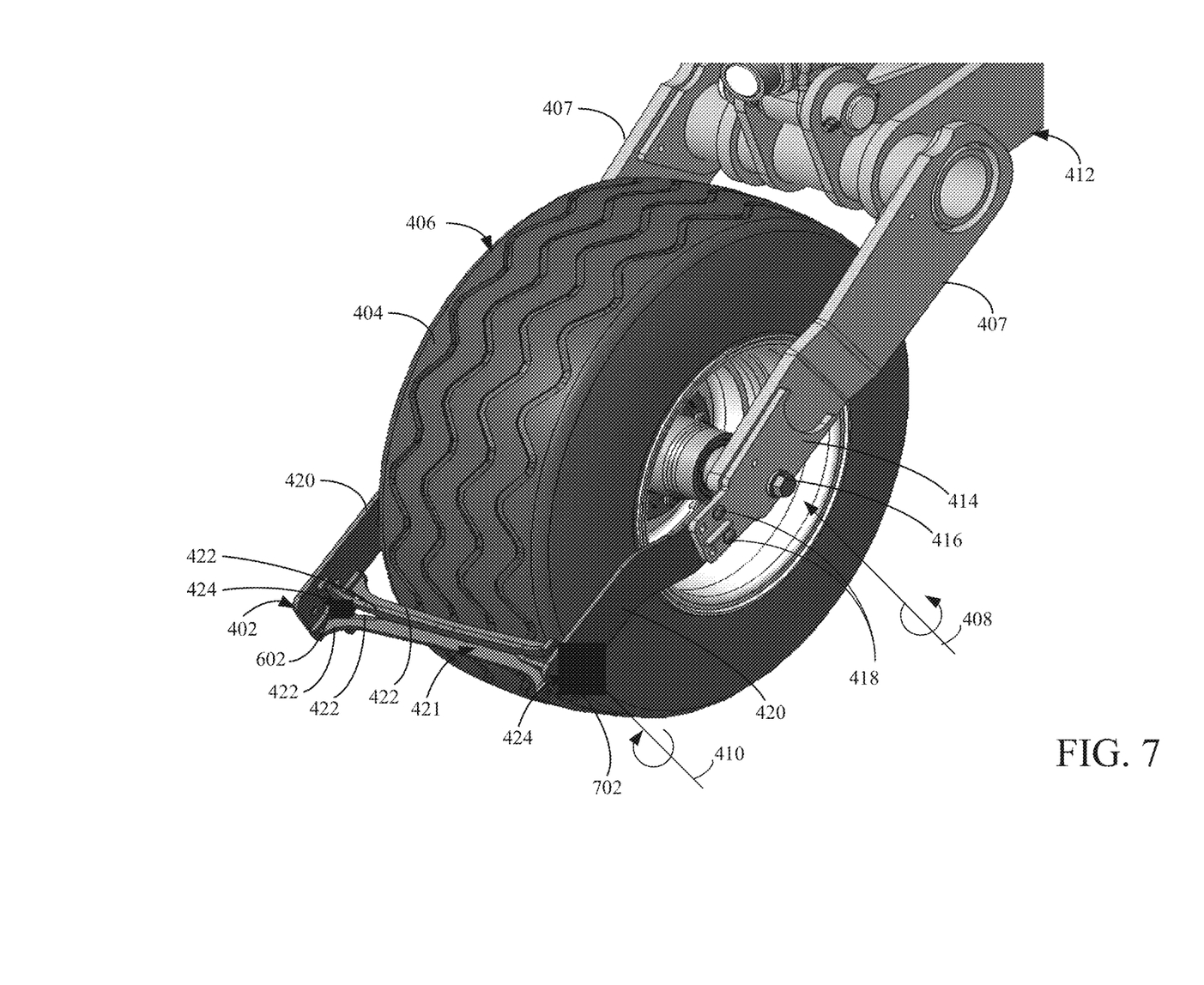
FIG. 7 is a perspective view of the rotating debris removal component of FIG. 4 but updated with an active spacing component.

FIG. 7 is a perspective view of the rotating debris removal component of FIG. 4 but updated with an active spacing components 702. Most items in FIG. 7 are similar to those shown in FIGS. 4 and 5, and they are similarly numbered. In the context of FIG. 4, the distance between paddles 422 and a surface proximate to which paddle wheel 421 is mounted is essentially fixed, the fixed distance being adjustable of course utilizing adjusting options built into side plates 420. In contrast, the active spacing components 702 in FIG. 7 represent an integration of mechanical components that causes the spacing between paddles 422 and a surface proximate to which paddle wheel 421 is mounted to be dynamic instead of essentially fixed.

The active spacing components 702 include, in one example, a biasing mechanism (e.g., a spring, hydraulically applied pressure, pneumatically applied pressure, etc.) that causes paddle wheel 421 to be biased toward a position closest to a surface being cleaned, while at the same time being accommodating a retreat to a position further from the surface when a rotating paddle 422 contacts debris. In this case, the paddle wheel is likely to be balanced in a slot that accommodates movement of the paddles 422 toward and away from the surface being cleaned. In another example, a distance between paddles 422 and a surface proximate to which paddle wheel 421 is mounted is selectively adjustable, for example, in response to a control signal. The control signal can originate from a user activation of a remote-control mechanism or from an automated algorithmic control mechanism.

In another example, the active spacing components 702 again include a biasing mechanism with paddle wheel 421 slidably mounted, for example, within a movement slot. In this case, the biasing mechanism causes one or more of paddles 422 to move in the slot so as to maintain contact with a surface being cleaned when cleaning is desired.

However, when cleaning is not desired, the force being applied by the biasing mechanism is selectively or automatically reduced. Reducing the force applied by the biasing mechanism is likely to lessen a risk of causing wear on the surface being cleaned. A compliant mounting enables larger items, such as stones, to pass more easily between the paddles 422 and the surface being cleaned.

It is to be understood that the specific material of which the described components are comprised is not critical. For example, some or all portions of the paddle wheel may be comprised or metal, plastic, or any other material. The same is also true for any or all other components and mechanisms described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An agricultural machine comprising a wheel cleaning debris removal component, the wheel cleaning debris removal component having a rotatable portion that rotates around an axis that is at least substantially parallel to an axis of rotation of a wheel that is part of the agricultural machine, wherein the debris removal component is mounted proximate to a ground engaging surface of the wheel, and wherein the rotatable portion includes a series of paddles.

2. The agricultural machine of claim 1, wherein the rotatable portion of the wheel cleaning debris removal component is a paddle wheel.

3. The agricultural machine of claim 2, wherein the paddle wheel is rotatably mounted to a side plate.

4. The agricultural machine of claim 1, wherein a bearing assembly is utilized to facilitate a rotatable connection between the rotatable portion and a side plate.

5. An agricultural machine component comprising a wheel cleaning paddle wheel, the wheel cleaning paddle wheel comprising a plurality of paddles and configured to be mounted proximate to a ground engaging surface of a wheel, wherein the agricultural machine component further comprises a side plate and a bearing assembly, the bearing assembly facilitating a rotatable connection between the paddle wheel and the side plate.

6. The agricultural component of claim 5, further comprising an active spacing component that controls where the wheel cleaning paddle wheel is positioned within a range of motion defined by a movement slot.

7. An agricultural machine comprising a wheel cleaning debris removal component mounted proximate to a ground engaging surface of a wheel, the wheel cleaning debris removal component comprising a paddle that is configured to rotate around a first axis in a direction that is opposite of a direction in which the wheel turns around a second axis during operation of the agricultural machine, wherein the paddle is one of a series of paddles that are part of the wheel cleaning debris removal component, all paddles in the series being configured to rotate around the first axis in a direction that is opposite of a direction in which the wheel turns around a second axis during operation of the agricultural machine.

8. The agricultural machine of claim 7, wherein the first and second axes are separated and substantially parallel to one another.

9. The agricultural machine of claim 7, wherein the wheel cleaning debris removal component is adjustably mounted so that a distance between the debris removal component and the ground engaging surface is mechanically selectable.

10. The agricultural machine of claim 7, wherein the debris removal component is mounted by way of a side plate.

11. The agricultural machine of claim 10, further comprising an adjustment slot formed in the side plate.

12. The agricultural machine of claim 7, wherein the debris removal component includes a bearing assembly.

13. The agricultural machine of claim 7, wherein the wheel cleaning debris removal component includes a bearing assembly that rotatably supports a paddle wheel of which the series of paddles are a part.

14. The agricultural machine of claim 7, wherein the series of paddles are a part of a paddle wheel.

15. The agricultural machine of claim 7, wherein the wheel cleaning debris removal component further comprises a bushing that separates a side plate from a paddle wheel, the series of paddles being part of the paddle wheel.

16. The agricultural machine of claim 7, wherein the wheel cleaning debris removal component is mounted proximate to the ground engaging surface by way of a side plate.

17. The agricultural machine of claim 16, wherein the side plate is adjustable so as to selectively change a distance between a portion of the wheel cleaning debris removal component and the ground engaging surface.

* * * * *